United States Patent [19]
Maxwell et al.

[11] 3,744,145
[45] July 10, 1973

[54] ORGANIC WASTE DRYER APPARATUS

[75] Inventors: Bert F. Maxwell, Santa Paula; Donald A. Price; Harold A. Price, both of Orange, all of Calif.

[73] Assignee: Julius Goldman's Egg City, Moorpark, Calif.

[22] Filed: Mar. 29, 1971

[21] Appl. No.: 129,077

[52] U.S. Cl. ............................... 34/68, 110/8, 34/180, 34/181, 432/140, 432/144
[51] Int. Cl. .............................................. F27b 9/24
[58] Field of Search ...................... 263/8, 28; 110/8

[56] References Cited
UNITED STATES PATENTS
3,515,078   3/1969   Maitilasso ........................... 110/8 R
3,327,659   6/1967   Nolan et al. ......................... 110/8 R
2,767,668   10/1956   Spooner ............................. 263/8 R

*Primary Examiner*—John J. Camby
*Attorney*—Jessup & Beecher

[57] ABSTRACT

An apparatus to effect drying of organic waste wherein the waste product is metered into a thin layer within a plurality of troughs upon the bed of a primary dryer apparatus, the waste product being moved through the troughs by a staggered plow arrangement, the waste products being subjected to conductive heat and convective heat and radiative heat within the dryer apparatus upon exit from the dryer apparatus the waste product being pulverized and conducted through a vertical dryer into a cyclone separator.

20 Claims, 11 Drawing Figures

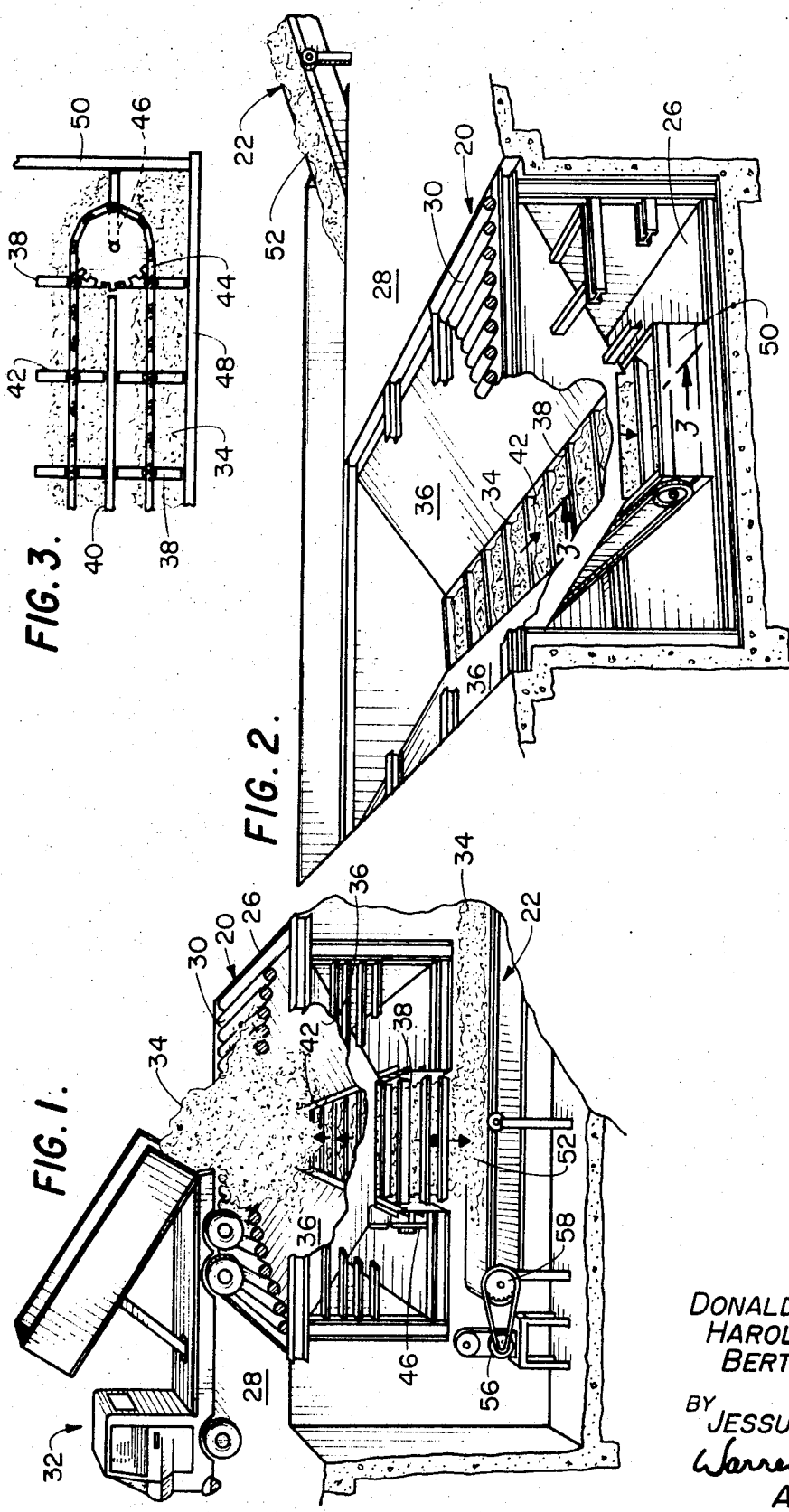

INVENTORS.
DONALD A. PRICE
HAROLD A. PRICE
BERT MAXWELL

BY JESSUP & BEECHER
Warren T. Jessup
ATTORNEYS

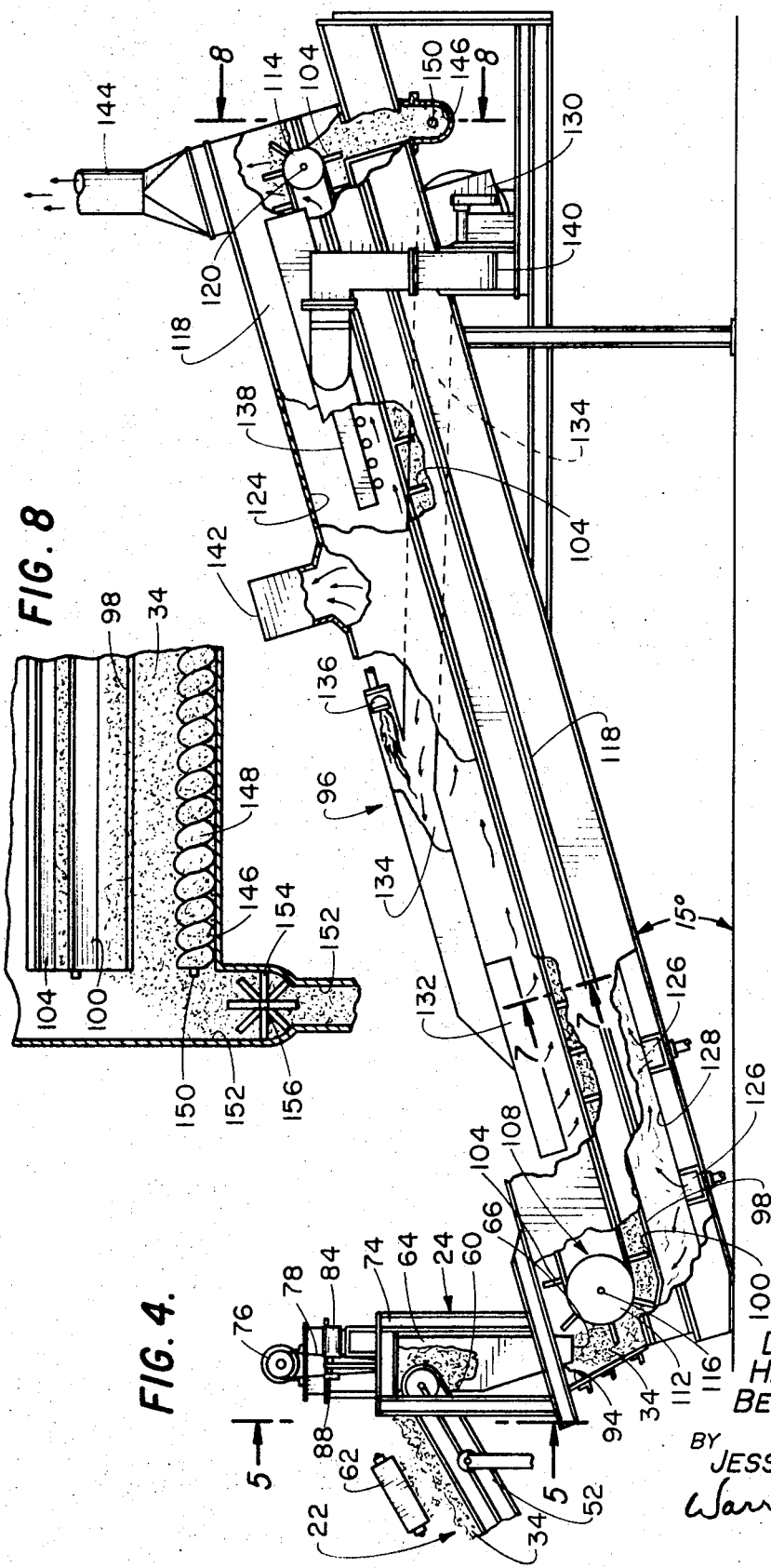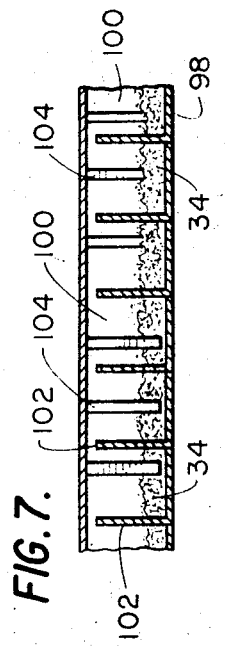

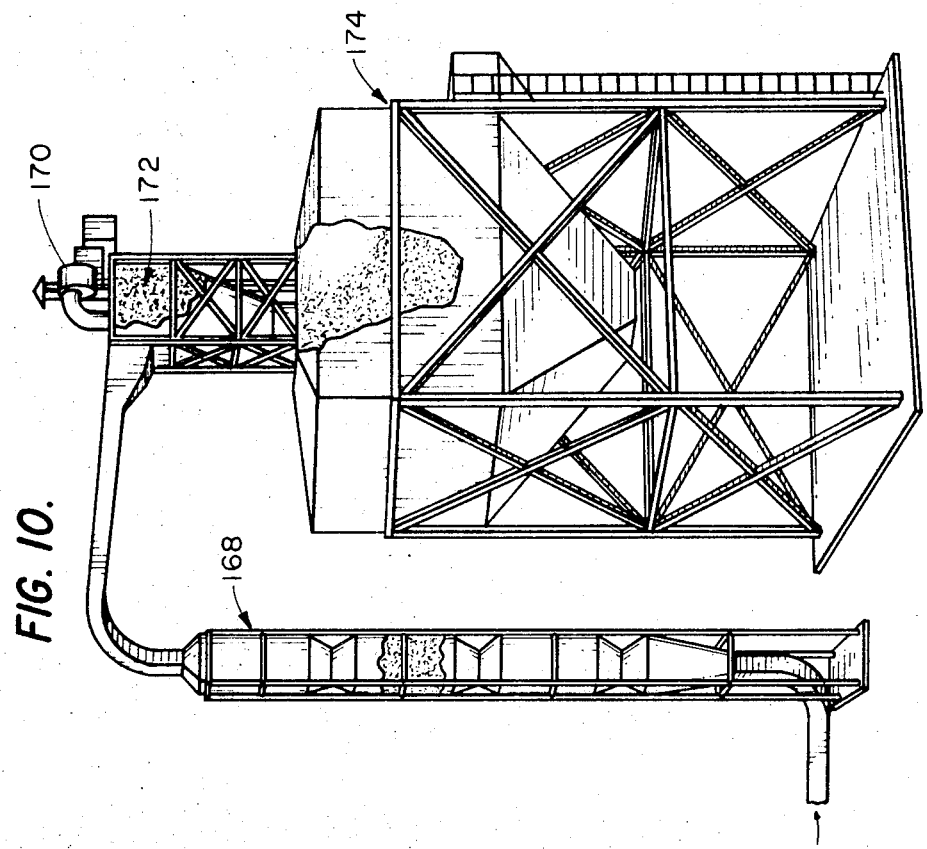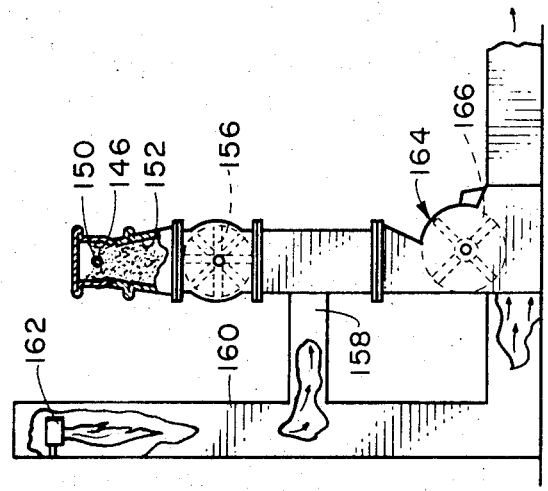

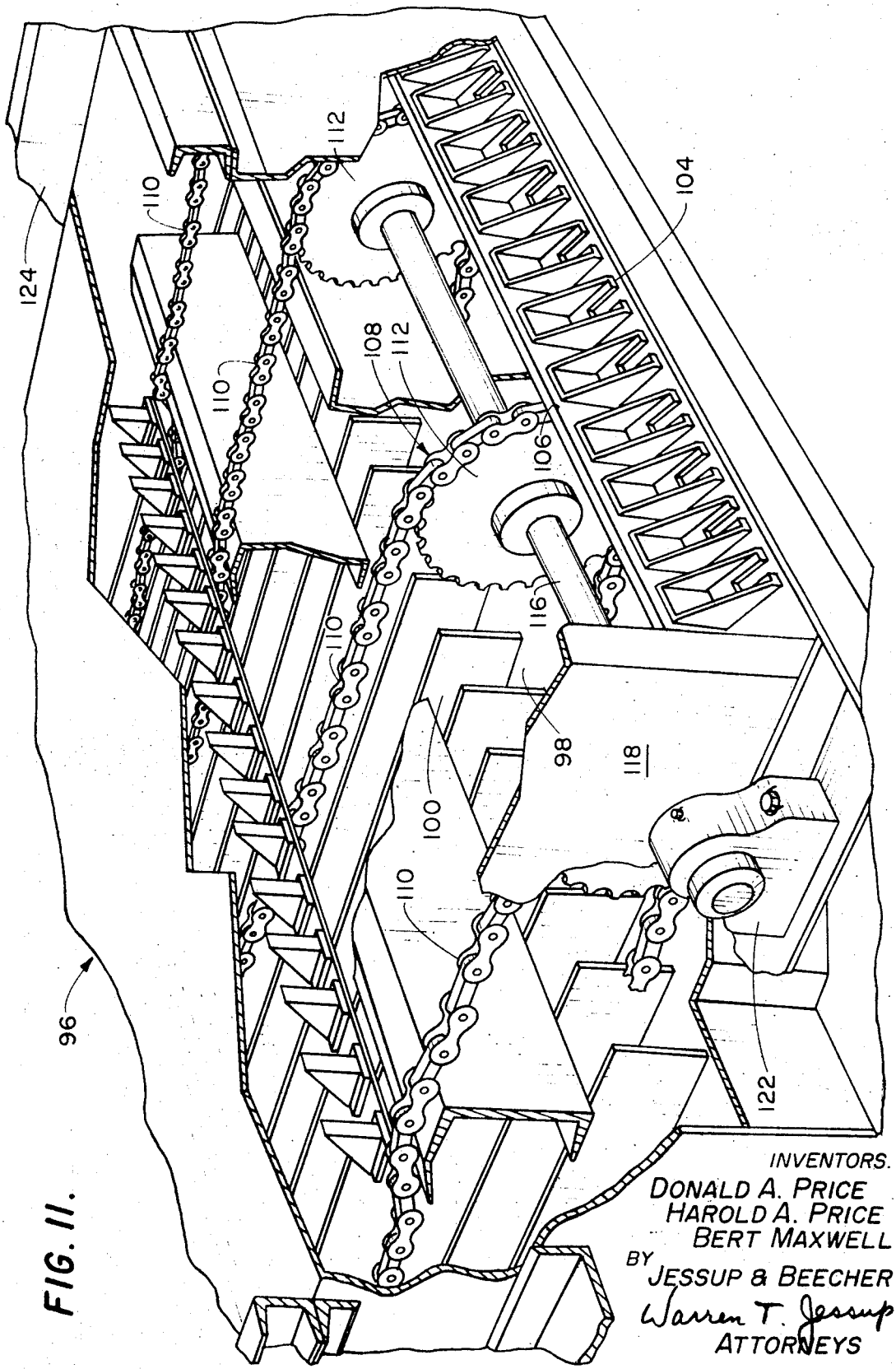

ORGANIC WASTE DRYER APPARATUS

BACKGROUND OF THE INVENTION

The field of this invention relates to an apparatus for disposing of organic wastes and more particularly to an apparatus which effects removal of moisture from the organic waste resulting in the formation of an organic waste which can be readily incinerated.

All waste material is eventually discharged into surface or ground water courses, which constitute the natural drainage of an area. Most waste material contain offensive and potentially dangerous substances, which can cause pollution and contamination of the receiving water bodies. Contamination is defined as the impairment of water quality to the degree that creates a hazard to public health. Pollution refers to the adverse effects on water quality that interfere with proper and beneficial use.

In the past, the dilution afforded by the receiving water body was usually great enough to render the volume of waste substances innocuous. Since the turn of the century, however, the dilution of many rivers has been inadequate to absorb the waste discharges caused by the increase in population and expansion of industry.

Because of the human population increase within recent years, there has also been a substantial increase in animal husbandry production to feed the increased mass of human population. As a result, along with the increase in the animal population, there has been a proportional increase in animal manures. Animal manures, such as poultry, cattle, sheep and hogs contain a substantial amount of moisture which makes the disposal of such difficult. Additionally, the sewage plant waste from the activated sludge process contains a substantial amount of moisture. Such manures and sewage plant waste tend to resist mechanical drying procedures and processes by adhering and caking upon the surfaces of such process equipment tending to form clumps and balls. Because of the properties of such waste products, surfaces of high heat insulation are formed upon the process equipment which tend to make the drying process inefficient. Also, such previous disposal processes create substantial volumes of moisture laden air and organic gases that are extremely odoriferous and tend to travel considerable distances permeating habitations and the atmosphere in general.

For a great many years, the most common method of disposing of organic waste has been land disposal. Land disposal is where the organic waste can be distributed upon agricultural land and plowed under. Although the organic waste enriches the soil, this practice has certain public health dangers and must be closely supervised.

Because in recent years of the large amount of organic waste which is being produced, a major portion of the waste cannot be disposed of by land disposal. Also, with the land disposal technique being phased out and fertilization being employed instead, some means must be employed to effect disposal of the organic waste.

It has been known common to employ the use of a drying bed to dispose of such wastes. Basically, the drying bed effects distribution of the organic waste within an area open to the atmosphere. Drying takes place by means of the sun. Although the dried waste from the drying bed has little or no odor, the drying procedure may take several weeks.

Also, in some instances, incineration of organic waste has developed as a means of disposal. Heretofore, such incineration requires auxiliary heat because of the moisture of the organic waste being substantial.

Basically, the process of the prior art for disposing of organic waste suffer seriously from one or more of three basic problems. The three problems are as follows: (1) Air pollution due to the emission of odors and particulate matter; (2) High expense of dehydration due to the problem of the organic waste adhering to the processing and handling equipment; (3) Difficulty in disposal of the dehydrated product after completion of the disposal process.

As a result of the above noted problems, the receiving and processing plants are being forced to move to less populated areas. This movement of plants cannot be readily accomplished without great expense especially where the plant is of substantial size.

SUMMARY OF THE INVENTION

The apparatus of this invention, which employs an efficient method of disposal of organic waste, uses as its principal component a primary drying apparatus. The organic waste is to be deposited into a metering hopper which conducts the organic waste and deposits such on a conveyor belt system in a steady stream. The organic waste on the conveyor belt system is then passed through a magnetic field which is to effect removal of any metallic elements which may be contained within the waste. The waste is then deposited into a metering hopper which distributes the waste into the inlet end of the dryer apparatus. The metering hopper is to oscillate along the entire width of the dryer bed so as to evenly distribute the waste therealong. The dryer bed comprises a plurality of elongated troughs placed in parallel relation to each other. The troughs are to be made of a heat conductive material such as steel or the like. Associated with each trough are a plurality of longitudinally spaced apart fingers which are to be movable within the trough. The fingers are to effect a pushing of the waste material along the bed of the dryer apparatus from the inlet end to the exit end. The bed of the dryer apparatus is inclined at approximately a 15° angle with respect to horizontal. The fingers within each trough are staggered with respect to the width of the trough so as to effect even movement of the waste material along each trough. Heat energy is supplied from a burner arrangement to a chamber located beneath the dryer bed. A portion of the heat energy is to be conducted through the material of the trough and into the organic waste material. The inherently produced convective heat energy which is produced within the chamber is moved by a blower assembly through appropriate ducting and supplied to the upper surface of the trough and directly onto the organic waste material. Radiative heat energy is also directly applied to the upper surface of the organic waste material through an infra-red heater assembly. The partially dried waste material then exits the dryer apparatus through an auger assembly and is conducted to a hammermill apparatus. The hammermill apparatus pulverizes the waste material into extremely small particles which permits the particles to be conducted by gases through a conduit into a vertical drying apparatus. The particles of waste material after passing through the vertical drying apparatus are conducted through a separating apparatus with the gaseous products being discharged. The resultingly formed particulate matter of the waste material is to be deposited as into a storage hopper.

A primary feature of this invention is to provide for an economical and practical answer for disposal of organic waste material.

Another feature of the apparatus of this invention is that it is fully compatible with the requirements of modern husbandry and waste disposal in that it receives and processes each days wastes as they are generated.

Another feature of the apparatus of this invention is that the dried end products can be readily incinerated in full compliance with air pollution standards to destroy entirely the organic matter therein resulting in the production of a readily disposable ash.

Another feature of this invention is that minerals may be captured and used in foodstuffs as a supplement or in fertilizer.

Another feature of the apparatus of this invention is that the incinerated end product can be employed as the prime source of energy for the primary drying apparatus.

BRIEF DESCRIPTION OF THE DRAWINGS

FIG. 1 is a fragmentary isometric view of the inlet hopper which conducts the organic waste material in a continuous steady stream to a feed conveyor;

FIG. 2 is a view similar to FIG. 1 but in the opposite direction of the apparatus of FIG. 1;

FIG. 3 is a cross-sectional view of a portion of the inlet hopper employed within this invention taken along line 3—3 of FIG. 2;

FIG. 4 is a simplified, longitudinal, cut-away view of the dryer apparatus and its associated metering hopper employed within this invention;

FIG. 7 is a cross-sectional view through a portion of the dryer bed within the dryer apparatus of this invention taken along line 7—7 of FIG. 4;

FIG. 8 is a cross-sectional view through the exit end of the dryer apparatus of this invention taken along line 8—8 of FIG. 4;

FIG. 9 is a diagramatic representation of the structure employed to effect pulverizing and additional drying of the organic waste material after exit from the dryer apparatus;

FIG. 10 is a diagramatic representation of the structure employed to effect the final drying of the organic waste material and the associated storage facility after completion of the drying; and FIG. 11 is a fragmentary, cut-away, isometric view of the inlet end of the dryer apparatus employed within this invention.

DETAILED DESCRIPTION OF THE SHOWN EMBODIMENT

Figure 5:
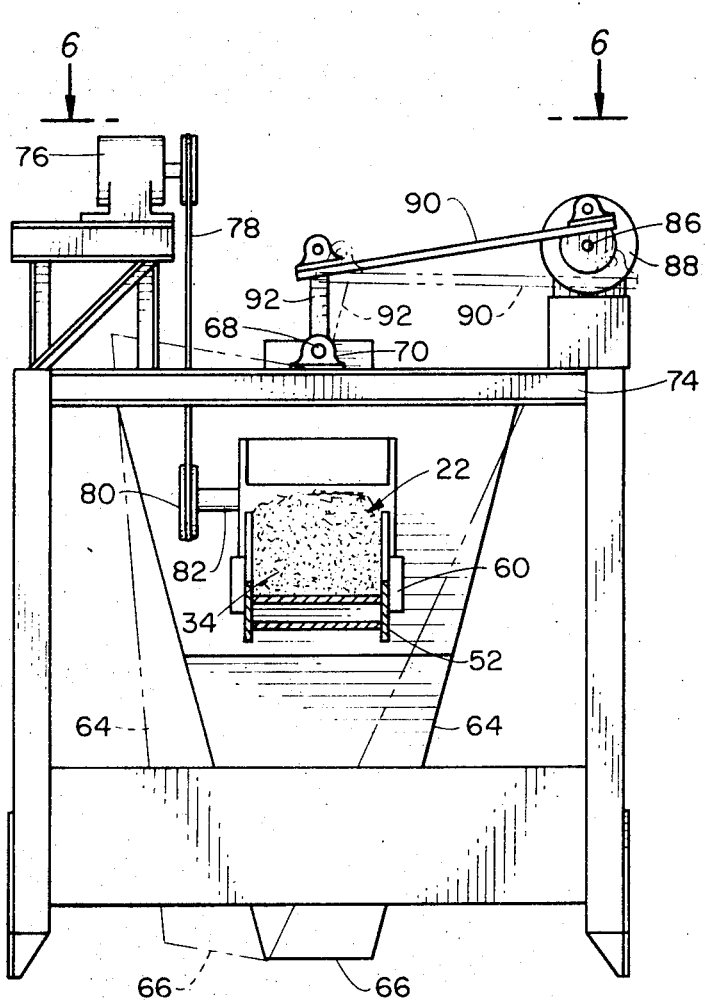
FIG. 5 is a front view of the metering hopper employed within this invention taken along line 5—5 of FIG. 4.
Figure 6:
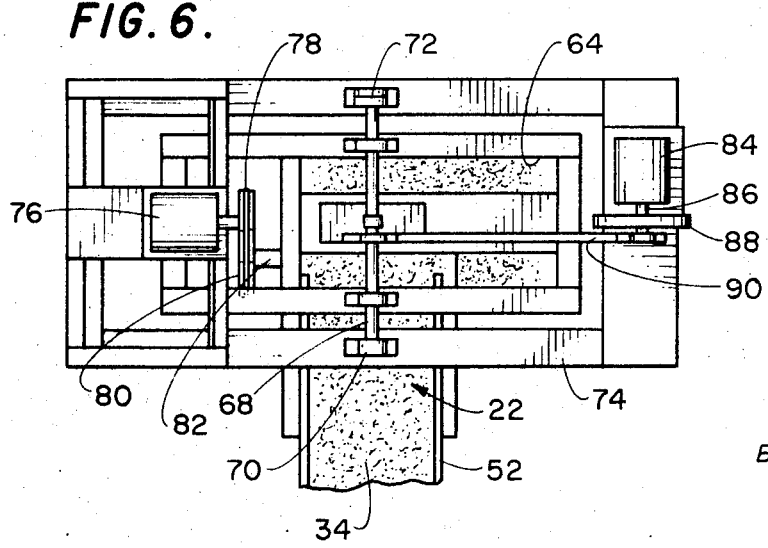
FIG. 6 is a cross-sectional view through the metering hopper and associated structure of this invention taken along lines 6—6 of FIG. 5.

Manures are usually handled in large volume and are commonly transported within a truck type of motor vehicle such as a dump truck. It is desired that a receiving device of the apparatus of this invention be employed which permits the dump truck to easily and quickly discharge its load of manure. The receiving device then is to automatically and evenly meter out at a steady rate to the drying apparatus the organic waste.

Referring particularly to the drawings, the receiving area employed within this invention provides for an inlet hopper 20, a conveyor assembly 22, and a metering hopper 24. The inlet hopper 20 is shown contained within a housing 26 which is encased within the ground or flooring 28. Located within the housing 26 and substantially level with the upper surface of the flooring 28 are a plurality of rollers 30. The rollers 30 are capable of rotational movement with respect to the housing 26. However, there is a certain amount of space located between each of the rollers 30. The arrangement is such that a vehicle such as a dump truck 32 carrying a load of manure 34 can be driven from the flooring 28 upon the rollers 30 and then dump the load of manure upon the rollers as shown in FIG. 1 of the drawings. The manure then passes through the spacing located between the rollers 30 and is guided by sides 36 of the inlet hopper 20 toward the drags 38.

Each of the drags 38 comprises a rectangular plate which is mounted on edge with respect to a first floor 40. The spacing between adjacent drags 38 is denoted as compartments 42. Each of the drags 38 are secured to a continuous chain 44. The chain 44 is wrapped around a pair of spaced apart drive pulleys 46. The pulleys 46 are fixed with respect to the housing 26 and are to be rotatably driven by means of a motor (not shown). When the pulleys are driven by the motor, the drags 38 move along the first floor 40 on edge as shown in FIG. 3 of the drawings. Actually, the manure located within each of the compartments 42 upon the first floor 40 is being moved in a direction opposite from the exit of the inlet hopper 20. At the back end of the inlet hopper 20 the manure is deposited from each compartment 42 upon a second floor 48 which is located beneath the first floor 40. By causing the manure to fall from the first floor 40 up to a second floor 48, it has been found that the manure within each compartment 42 is regulated to be substantially equal in volume. End plate 50 prevents the manure 34 at the back end of the hopper 20 from being conducted exteriorly of a compartment 42. The drags 38 can now continue to move the manure 34 along the second floor 48 toward the discharge end of the hopper 20. A gate may be employed at the discharge end to regulate the flow of discharge to further insure that the flow of manure is metered at a steady constant rate.

The manure from the inlet hopper 20 is to be discharged onto a continuous belt 52 of the conveyor assembly 22. The conveyor system is shown to be substantially horizontal at the discharge section of the inlet hopper 20 and to be inclined upwardly in the area of the metering hopper 24. A motor 56 is connected to a drive pulley 58 and effects movement of the conveyor belt 52. The conveyor system functions to move the manure from the inlet hopper 20 to the inlet opening 60 of the metering hopper 24. A magnetic separator assembly 62 is located directly adjacent the manure 34 on the inclined portion of the conveyor belt 52. It is the function of the magnetic separator assembly 62 to remove any ferrous particles which may be included within the manure 34. It is to be understood that it is not absolutely necessary to employ the magnetic separator assembly 62, but is desirable to insure nonpassage of ferrous particles through the entire apparatus. It is also to be understood that although only one inlet hopper 20 is shown, two such hoppers 20 may be employed, one located on each lateral side of the conveyor assembly 22. It is also to be understood that although a belt type of conveyor is shown it is to be understood that other types could be employed for example, a compartmentilized drag system similar to what was employed in the inlet hopper 20.

The metering hopper assembly 24 includes a metering hopper 64 which has an upper inlet opening 60 and a lower discharge opening 66. The metering hopper 64 is pivotally mounted upon a pivot shaft 68. The pivot shaft 68 is mounted by trunnions 70 and 72 upon a frame 74. The frame 74 is fixedly secured to supporting structures such as flooring 28 or other fixed structure.

Secured to a portion of the frame 74 is a motor 76 which through a driving belt 78 drives a drive pulley 80. The drive pulley 80 is connected to a shaft 82 which is fixedly secured to an appropriate driving means (not shown), which in turn effects movement of belt 52 of the conveyor assembly 22. In essence, the motor 76 effects movement of the inclined portion of the conveyor assembly 22 with the motor 56 effecting movement of the horizontal portion of the conveyor assembly 22.

A motor 84 is also secured to the frame 74 with the shaft 86 of the motor 84 effecting rotation of the flywheel 88. A linkage arm 90 is mounted for pivotable eccentric movement upon the flywheel 88. The free end of the linkage arm 90 is pivotally secured to a fixed arm 92. The arm 92 is fixedly secured to the shaft 68.

The manure that has moved through the inlet hopper 20 and has been deposited in a steady stream upon the conveyor belt 52 is conducted and deposited within the inlet opening 60 of the metering hopper 64. The motor 84 causes the linkage arm 90 to move longitudinally a predetermined distance. This longitudinal movement of the linkage arm 90 is transmitted through the fixed arm 92 and effects pivotal movement of the shaft 68 with respect to the frame 74. As a result, pivotal movement of the metering hopper 64 occurs with the discharge end 66 moving transversely across the inlet opening 94 of a primary dryer apparatus 96. The function of the oscillating movement of the metering hopper 64 is to evenly distribute the manure across the width of the dryer bed 98 of the apparatus 96. As long as the conveyor belt 52 of the conveyor system 22 is being operated, the hopper 64 continuously oscillates back and forth across the width of the dryer bed 98, thereby evenly distributing the manure thereacross.

The construction and arrangement of the inlet hopper 20 the conveyor assembly 22 and the metering hopper 24, all of which constitute the receiving structure incorporated within this invention, has been designed to be readily maintained and repaired without removal thereof. However, if removal is required, such can be readily accomplished.

In order to reduce the tendency of the manure 34 to stick and cake to the processing equipment, it is necessary that the manure be exposed to substantial heat energy during the drying process. It has been found necessary that it is not only desirable to subject the manure to drying by convection, but also by conduction and radiation. Additionally, the manure tends to form balls and clumps which will dry on the surface but remain wet inside. As a result, it has been found to be necessary to constantly stir and knead the manure mechanically to keep the drying surfaces of the dryer clean from caked manure and also to keep the balls and clumps broken up. Additionally, the caking of the manure upon the mechanical drying surfaces exhibits very poor heat transfer characteristics, which therefore require mechanical apparatus which keeps the drying surfaces clean.

One objective of the primary drying apparatus 96 of this invention is to raise the temperature of the manure to a point where contained moisture will be released and all pathogens as well as all plant life destroyed. This objective is gained by dividing the dryer bed 98 into a plurality of elongated parallel troughs 100. Each of the troughs 100 are formed of a heat conductive material such as steel or the like. Basically, each trough 100 is channel shaped having a bottom surface being formed of a portion of the dryer bed 98 with side walls 102 extending upwardly therefrom. The objective of the construction of each trough 100 is such that heat energy is readily conductible from the dryer bed 98 upwardly through the side walls 102 and dissipated into the area of the trough 100. As a result, the heat energy is entering each of the troughs 100 from each of the side walls and the bottom thereof.

The other objective of the apparatus of this invention is to provide even distribution of the manure into the troughs 100 so that maximum use of the heated surfaces of the troughs may be realized. This is achieved through the use of the previously mentioned metering hopper 64. The metering hopper is timed to distribute the manure evenly across the entrance end of the troughs 100. If for some reason the manure is being supplied at too fast a rate into the metering hopper 64, an apparatus is to be employed which would automatically stop the operation of the conveyor assembly 22 and the inlet hopper 20. During this "time out" period, the metering hopper 64 would continue to oscillate continuing distribution of the manure within the dryer 96. After this "time out" period, the conveyor assembly 22 and the inlet hopper 20 would automatically restart resulting in the supplying of manure again to the metering hopper 64. This "time out" period permits the emptying or substantial emptying of the accumulated manure within the metering hopper 64.

Another objective of the primary dryer apparatus 96 of this invention is to mechanically move the manure through the troughs 100 by a means that will automatically keep the heated surfaces free of caked manure, while at the same time mixing and kneading the material so that the manure when discharged from the apparatus of 96 be in the form of small pellet like particles. To achieve this objective, a plurality of fingers 104 are to cooperate within each trough 100. The fingers are secured to a transverse bar 106 which supports a transverse row of the fingers for each of the troughs 100. A transverse bar is fixedly secured to a continuous chain drive assembly 108. The chain drive assembly 108 includes a plurality of transversely spaced apart continuous chains 110. It is to be noted that in actual practice, four in number of such chains 110 has been found to be desirable. However, it is to be understood that the number of such chains is to be considered a matter of choice of design.

Each of the chains 110 is mounted upon a driving pulley 112 at the inlet end of the dryer apparatus 96 and an idler pulley 114 located at the exit end of the dryer apparatus 96. Each of the driving pulleys 112 is fixedly mounted upon a shaft 116. Each of the idler pulleys 114 is fixedly mounted upon a shaft 120. The shaft 116 is rotatably mounted by means of trunnions 122 with the trunnions 112 being fixedly secured upon the dryer apparatus housing 118. The shaft 116 is to be rotatably driven by means of a motor (not shown). Upon operation of the motor (not shown), the chains 110 are moved about their pulleys 112 and 114 thereby effecting movement of the fingers 104 within the troughs 100. It is to be noted that the entire drive assembly 108 is located within a chamber 124 formed within the housing 118. It is important to note that the fingers 104, in moving back from the exit end of the dryer apparatus 96, move adjacent the upper end of the chamber 124. This is desirable for reasons which will become more apparent further on in the description.

It is to be noted that each of the fingers 104 are located at a different transverse placement within its respective trough with respect to longitudinally adjacent fingers 104. In other words, the fingers 104 within each trough are located in a staggered condition. This staggering of the fingers 104 is so that the fingers tend to move, knead and mix a different portion of the manure as the fingers 104 move through the trough. Also, the fingers 104 do not permit the manure to cake upon the surfaces of the trough and prevent the desired heat transfer into the manure. Because of the staggered condition of the fingers, the surfaces of the troughs are constantly being wiped clean.

The design of each of the fingers 104 is considered a matter of choice and design. It is found to be desirable to use a rectangular or square shaped finger, however, the use of a round or cylindrical shaped finger is not to be precluded.

Another objective of this invention is to be able to vary the movement velocity of the fingers within the heated trough to be compatible with the varying moisture consistency of the manure. This is accomplished by employing a variable speed motor which drives the driving pulleys 112. Such is desirable as the manure upon leaving the primary dryer apparatus 96 should be of the same moisture content regardless of the moisture content of the manure entering the drying apparatus 96.

The primary source of heat energy is supplied by a plurality of gas furnaces 126 which are located within a chamber 128 within a housing 118. The chamber 128 is located beneath the dryer bed 98. Each of the furnaces 126 are supplied gas from a source (not shown) which is ignited within the chamber 128. Normally, the temperature within the second chamber 128 will be within the range of 500° to 750° Farenheit. It is to be understood that the operator will have adjustment means to control the temperature within the second chamber 128.

The heat energy is to be directly conductible through the dryer bed 98 and into the side walls 102 of each of the troughs 100. As a result, the manure 34 within each of the troughs 100 is being subjected to conductive heat energy, this heat energy being transferred from the chamber 128 by means of fan 130 and supplied to plenum 132 through a duct system 134. Because a certain amount of the heat energy is lost during this conductance through the duct system 134, an additional heat source supplied by a burner 136 is to reheat the air located within the duct system 134. The plenum 132 is employed to transversely displace the heated air with respect to the dryer bed 98 and effect an impingement of the air onto and into the manure contained within the troughs 100. In other words, the manure 34 is now being subjected to convection heating as well as conduction heating. It is normally desired that the air leaving the plenum 132 be at approximately 450° Farenheit. The plenum 132 is located between the forward and return portion of the continuous chain drive assembly 108. The plenum 132 is to be conventionally supported by means (not shown) to the side walls of the primary dryer apparatus 96.

It is to be noted that the heated air within the chamber 124 functions to pass around the fingers 104 upon their being returned from the exit end of the apparatus to the inlet end of the dryer apparatus. The heated air in the chamber 124 then functions to completely dry any of the manure which may be stuck to the fingers 104 permitting such to fall free of the fingers 104 prior to reusage. This is an important feature of this invention.

Another objective of this invention is the further removal of moisture from the manure and to pasteurize deep inside fibrous materials or conglomerate masses prior to discharge from the primary dryer apparatus 96. Also, it is the objective of the dryer apparatus 96 of this invention to destroy all objectionable air pollution effluents so as to comply in full with air pollution regulations. The above objectives are to be achieved by placing directly over the heated troughs an infra-red gas fired burner assembly 138. Although the infra-red burner assembly does not subject the manure to a certain amount of heat energy by convection, the primary type of heat energy which the infra-red burner subject the manure to is heat energy by radiation. Air is supplied to the infra-red burner assembly 138 by means of a fan 140.

A first vent to the ambient is provided by stack 142 just downstream from the infra-red burner assembly 138. The reason for stack 142 is that the moisture content and gas content which may be quite extensive will not prohibit the transfer of heat energy from the infra-red burners through the manure 134.

Located upstream of the infra-red burner assembly 138 is a second vent provided by a stack 144. The remaining moisture and gases which are contained within the chamber 124 are then exhausted to ambient through the stack 144.

It is to be understood that the material being discharged through the stacks 142 and 144 will be exhausted into the ambient in full compliance with the air pollution regulations. If necessary, burners may be employed within the stacks to combust any combustible gases passing therethrough, and also filtering systems may be employed to collect any particulate matter which may be passing therethrough. However, it is envisioned that employing the primary dryer apparatus 96 of this invention does not significantly produce any undesirable combustible gases which may put hydrocarbons into the atmosphere, or does not significantly produce any particulate matter. The products contained within the stacks 142 and 144 should primarily constitute moisture.

The manure 44 after being dried by the primary dryer apparatus 96 is deposited by the fingers 104 through the exit end of the housing 118 into an auger housing 146. Located within the auger housing 146 is an auger 148 which is fixed upon a shaft 150. The auger 148, through shaft 150, is rotatably driven by a motor (not shown). The auger 148 is to conduct the manure leaving the dryer apparatus 96 to a supply conduit 152. Normally, the manure leaving the dryer housing 96 will contain approximately 25 to 35 percent moisture by weight. Hence, the manure may be further processed as hereinafter described and/or sent to other uses such as field applied fertilizers or other similar uses. However, if it is desired to further demoisturize the manure, the following apparatus may be employed.

The following apparatus has been specifically designed to remove moisture and still not destroy nutrients in the manure and/or create air pollution emissions. The manure which drops into the supply conduit 152 often times consists of small clumps, balls, etc. formed around feathers and chicken manure, foilage within other manures, and latex and other similar materials which are not digested in activated sewage sludge solids. Therefore, it is desirable to break into small granules the clumps of materials which contain most of the still entrained moisture. This objective gains for this invention two desirable characteristics the first being a more desirable end product and the second being that it is much easier to complete the final dehydration of the manure by greatly increasing the surface drying area.

To accomplish the above objective, the manure is conducted from the supply conduit 152 into a rotary valve assembly 154. The rotary valve assembly 154 is driven by a shaft 156 and is to regulate the flow of the manure through the supply conduit 152. Also, the rotary valve assembly 154 buffers the fall of the manure down the supply conduit 152. Additionally, the rotary valve assembly 154 segregates the air pressure of the chamber located beneath the rotary valve assembly 154 as compared to the chamber located above the rotary valve assembly 154. The valve assembly 154 is driven by a motor (not shown).

A first duct 158 carrying a hot air stream conducts the hot air into the supply conduit 152 downstream of the rotary valve 156. The first duct 158 is connected to a main duct 160 which is open to the ambient with a burner 162 effecting the heating of the air passing therethrough.

The combination of the hot air and the manure which is conducted within the supply conduit 152 past the rotary valve assembly 156 is transmitted into a hammermill apparatus 164. Basically, the hammermill apparatus 164 is deemed to be conventional and consists of replacable blades fastened to a center drive shaft. The blades are caused to be extended by centrifugal force causing a pulverizing of the manure adjacent the interior of the hammermill housing. The pulverized material, upon achieving the desired pulverized size, is permitted to pass through a screen 166 back into the main conduit 160.

The hot air which is being supplied through the hammermill not only facilitates the drying of the manure but also facilitates the conducting of the manure through the screen 166. The pulverized manure should now be quite small and readily carried by the gaseous flow through the main duct 160 toward the vertical dryer apparatus 168. The air is being pulled through the main duct 160 by a means of a blower assembly located above the vertical dryer apparatus 168. The blower apparatus 170 is to be sufficiently strong enough to tend to pull the air and the particles of manure vertically upward through the dryer apparatus 168. What occurs within the vertical dryer apparatus 168 is that the particles must whirl around within the apparatus and only pass past the vertical dryer upon being relieved of sufficient moisture so as to be light enough in weight. After leaving the vertical dryer apparatus only a very small amount of moisture remains within the manure 34, approximately 5 percent.

The next objective is to separate the saturated hot air from the dried manure. To achieve this, the combination of air and dry manure is supplied into a cyclone separator 172. Within the cyclone separator 172 the heated air is discharged at the upper end thereof into the ambient with the pulverized manure being permitted to fall at the lower end of the separator. The construction of the cyclone separator 172 is deemed to be convention and need not be described here in detail.

With some types of manures being processed it may be advisable to discharge the hot air emission from the first cyclone separator 172 into a second cyclone separator. Such an instance would be desirable where the dried product tends to be dusty and the use of such a second cyclone separator would be desirable in order not to lose product and to comply with particulate matter emissions of the air pollution regulations.

The final discharge temperature of the air from the cyclone separator 172 must be such that it is above the dew point for the ambient. Hence, the design of the final drying stage must be accomplished so that proper heat air balances exist to not only remove the moisture in the product to the desired level, but also without degrading the product or causing organic gas releases which would be odoriferous to the atmosphere. Controls are to be employed in combination with this final drying stage so as to allow the operator to regulate the discharge temperature.

The dried end product from the cyclone separator 172 can be permitted to fall within a storage hopper 174. Within this storage hopper 174 the dried manure can be retained until it is desired to be used and to be conveyed to a furnace where the material might be burned with the heat energy being employed to effect drying of the manure within the primary drying apparatus 96.

In certain instances it may be desirable to feed back as portion of the dried manure to intermix with the incoming wet manure. It is envisioned that as great as 40 to 50 percent of the dried manure may be resupplied to the primary drying apparatus 96. This will tend to prevent the wet manure from forming an insulative outer surface which resists penetration by heat energy. Additionally, the moisture within the wet manure will be distributed to the dry manure facilitating the drying procedure. This same concept can be applied to the hammermill apparatus 164 with approximately fifteen percent of the dried product to be resupplied to the hammermill to intermix with the partially dried manure to facilitate the final drying procedure.

What is claimed is:

1. An organic waste dryer apparatus comprising:
    a housing having an inlet opening and an exit opening, said inlet opening to permit supplying of waste into said dryer apparatus, said exit opening to effect removal of said waste from said dryer apparatus;
    first means located within said housing to effect movement of said waste from said inlet opening to said exit opening;

second means located within said housing and above said waste to expose said waste to heat energy by radiation;

third means to expose said waste to heat energy by convection; said third means located above said waste;

fourth means to expose said waste to heat energy by conduction; said fourth means located below said waste;

said third and fourth means employing the same source of heat energy.

2. Apparatus as defined in claim 1 wherein:

said first means includes a dryer bed upon which said waste is moved through said apparatus said dryer bed being formed into a plurality of separate troughs, said troughs being constructed from a heat conductive material.

3. An organic waste dryer apparatus comprising:

a housing having an inlet opening and an exit opening, said inlet opening to permit supplying of waste into said dryer apparatus, said exit opening to effect removal of said waste from said dryer apparatus;

first means located within said housing to effect movement of said waste from said inlet opening to said exit opening;

second means located within said housing and above said waste to expose said waste to heat energy by radiation;

said first means includes a dryer bed upon which said waste is moved through said apparatus said dryer bed being formed into a plurality of separate troughs, said troughs being constructed from a heat conductive material;

said troughs being substantially channel shaped with the apex of the channel forming the bottom surface of said dryer bed and the channel side walls extending upwardly therefrom, the conduction of heat energy being transmitted from said bottom surface into said side walls.

4. Apparatus as defined in claim 3 wherein:

said fourth means includes a first chamber located beneath said dryer bed, a source of heat energy located within said first chamber.

5. Apparatus as defined in claim 4 wherein:

said third means includes a second chamber located above said dryer bed, fan means to move the heat energy from said first chamber into said second chamber.

6. Apparatus as defined in claim 5 wherein:

said fan means moving the heat energy through a duct system, a plenum connected to said duct system and located within said second chamber, said plenum to effect even distribution of the heat energy from said duct system into said second chamber.

7. Apparatus as defined in claim 6 wherein:

an additional source of heat energy located within said duct system.

8. An organic waste dryer apparatus comprising:

a housing having an inlet opening and an exit opening, said inlet opening to permit supplying of waste into said dryer apparatus, said exit opening to effect removal of said waste from said dryer apparatus;

first means located within said housing to effect movement of said waste from said inlet opening to said exit opening;

second means located within said housing to expose said waste to heat energy by radiation;

said first means includes a dryer bed upon which said waste is moved through said apparatus, said dryer bed being formed into a plurality of separate troughs, said troughs being constructed of a heat conductive material;

said troughs being substantially channel shaped with the apex of the channel forming the bottom surface of said dryer bed and the channel side walls extending upwardly therefrom, the conduction of heat energy being transmitted from said bottom surface into said side walls;

a first chamber located beneath said dryer bed, a source of heat energy located within said first chamber;

a second chamber located above said dryer bed, fan means to move the heat energy from said first chamber into said second chamber;

said fan means moving the heat energy through a duct system, a plenum connected to said duct system and located within said second chamber, said plenum to effect even distribution of the heat energy from said duct system into said second chamber;

said second means being located within said second chamber.

9. Apparatus as defined in claim 8 wherein:

said second means being located upstream of said plenum.

10. Apparatus as defined in claim 9 wherein:

a first vent to ambient is provided intermediate said plenum and said second means.

11. Apparatus as defined in claim 10 wherein:

said second means comprises a plurality of infra-red burners.

12. Apparatus as defined in claim 10 wherein:

a second vent to ambient is provided upstream of said second means.

13. An organic waste dryer apparatus comprising:

a housing having an inlet opening and an exit opening, said inlet opening to permit supplying of waste into said dryer apparatus, said exit opening to effect removal of said waste from said dryer apparatus;

first means located within said housing to effect movement of said waste from said inlet opening to said exit opening;

second means located within said housing to expose said waste to heat energy by radiation;

said first means includes a dryer bed upon which said waste is moved through said apparatus, said dryer bed being formed into a plurality of separate troughs, said troughs being constructed of a heat conductive material;

said dryer bed being canted at approximately fifteen degrees with respect to horizontal with the exit end of said dryer bed being greater in height than the inlet end.

14. An organic waste dryer apparatus comprising:

a housing having an inlet opening and an exit opening, said inlet opening to permit supplying of waste into said dryer apparatus, said exit opening to effect removal of said waste from said dryer apparatus;

first means located within said housing to effect movement of said waste from said inlet opening to said exit opening; and second means located within said housing to expose said waste to heat energy by radiation;

said first means includes a dryer bed upon which said waste is moved through said apparatus, said dryer bed being formed into a plurality of separate troughs, said troughs being constructed from a heat conductive material;

said first means including a finger assembly, said finger assembly having a plurality of spaced apart finger elements to move within each of said troughs toward said exit opening of said housing.

15. Apparatus as defined in claim 14 wherein:
each of said finger elements being substantially less in width than the width of its respective trough.

16. Apparatus as defined in claim 15 wherein:
each of said finger elements within each trough being staggered with respect to each other across the width of its respective trough.

17. Apparatus as defined in claim 5 wherein:
said first means include a finger assembly, said finger assembly having a plurality of spaced apart finger elements to move within each of said troughs toward said exit opening, said finger assembly being movable by means of a continuous drive member assembly, said finger elements being moved from said exit opening to said inlet opening through said second chamber out of association with said troughs.

18. Apparatus as defined in claim 17 wherein:
said continuous drive member assembly being driven by a motor assembly, said motor assembly being capable of being varied in speed to thereby vary the velocity of movement of said finger elements with respect to said dryer bed.

19. Apparatus as defined in claim 17 wherein:
said continuous drive member assembly comprising a plurality of separate continuous drive elements.

20. Apparatus as defined in claim 19 wherein:
each of said continuous drive members comprising a chain.

* * * * *